Figure 1:
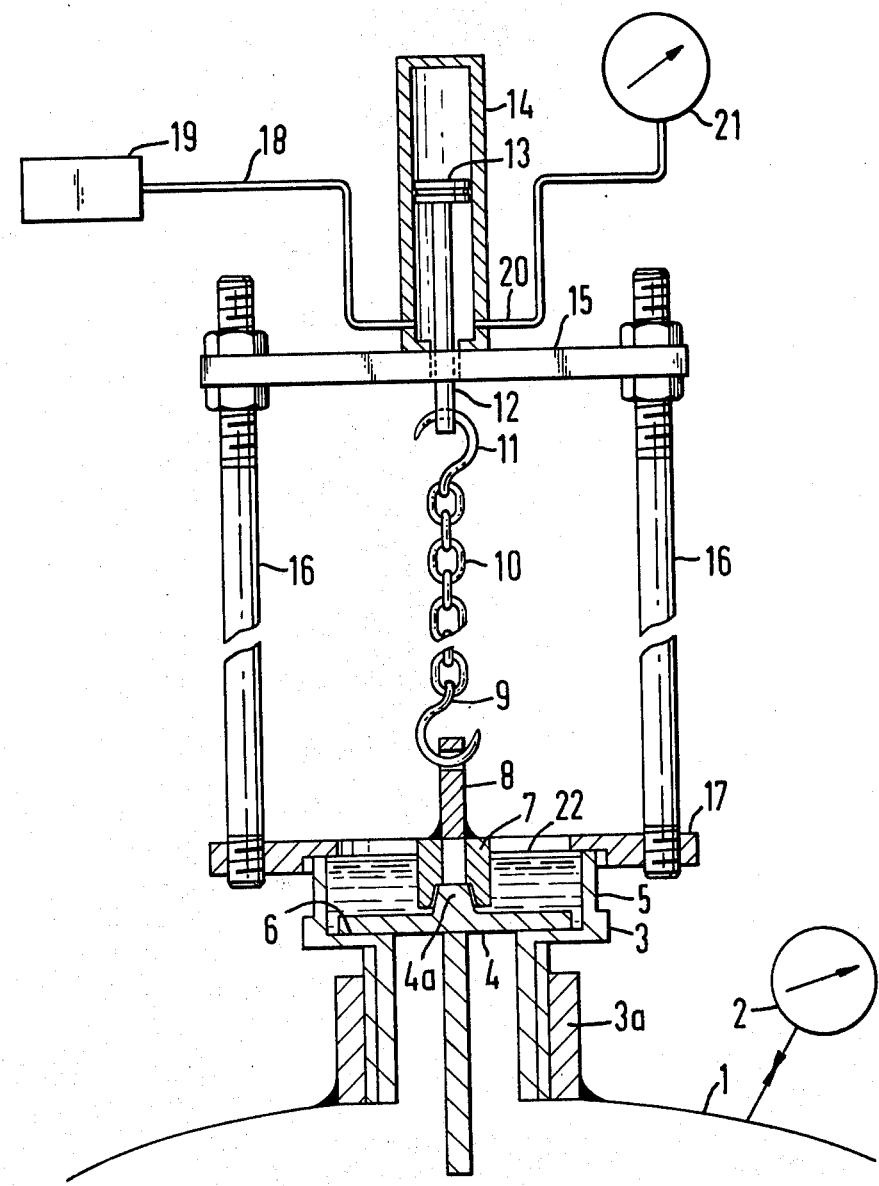

United States Patent [19]

Grymonprez et al.

[11] 4,255,967
[45] Mar. 17, 1981

[54] METHOD AND APPARATUS FOR TESTING THE SETTING OF A VALVE

[75] Inventors: Paul A. Grymonprez, Brussels; Robert H. M. Ruyssers, Antwerp, both of Belgium; Brian G. Barker, Grove (Near Wantage), England

[73] Assignee: Exxon Research & Engineering Co., Florham Park, N.J.

[21] Appl. No.: 59,197

[22] Filed: Jul. 20, 1979
(Under 37 CFR 1.47)

[30] Foreign Application Priority Data

Jul. 20, 1978 [BE] Belgium ............................. 189419

[51] Int. Cl.³ .................... F16K 37/00; G01M 13/00
[52] U.S. Cl. ........................................ 73/168; 73/9; 73/49.8; 116/277; 137/551
[58] Field of Search .................... 73/168, 46, 37; 116/277

[56] References Cited

U.S. PATENT DOCUMENTS

| 1,571,958 | 2/1926 | Mueller et al. | 73/46 |
| 2,178,901 | 11/1939 | Webster | 73/37 X |
| 2,264,515 | 12/1941 | Fear | 73/46 |
| 2,691,773 | 10/1954 | Lichtenberger | 73/46 X |
| 2,934,943 | 5/1960 | Carrie | 73/46 |
| 2,959,050 | 10/1960 | Franch | 73/46 |
| 3,344,807 | 10/1967 | Lehrer et al. | 73/46 X |
| 3,857,282 | 12/1974 | Doorley et al. | 73/168 |
| 4,029,122 | 6/1977 | Jaegtnes | 137/551 |
| 4,181,017 | 1/1980 | Markle | 73/168 |

FOREIGN PATENT DOCUMENTS 533375 5/1954 Italy ................................. 73/168

Primary Examiner—Daniel M. Yasich
Attorney, Agent, or Firm—Robert S. Salzman

[57] ABSTRACT

A method and apparatus for testing the setting of a valve (particularly a safety valve mounted on a vessel) comprising a valve member biassed towards a valve seat, employs a pulling device which is engaged with the valve member and operated to apply a tractive force opposed to the bias which is just sufficient to separate the valve member from the valve seat. The pulling device is preferably operated by a hydraulic or pneumatic pump. The hydraulic or pneumatic pressure which is just sufficient to separate the valve member from the valve seat is indicated by a suitable gauge and is proportional to the tractive force. The sum of the tractive force and the force acting on the valve from inside the vessel and which can be calculated from the internal pressure indicated on a pressure gauge communicating with the interior of the vessel is indicative of the setting of the valve. The separation of the valve member from the valve seat is conveniently indicated by bubbles in a layer of liquid overlying the valve member.

7 Claims, 2 Drawing Figures

METHOD AND APPARATUS FOR TESTING THE SETTING OF A VALVE

The present invention relates to a method and apparatus for testing the setting of a valve, more particularly, a valve of the type which has a valve member biassed towards a valve seat by resilient means such as a spring, still more particularly a valve of the type wherein a valve member is biassed towards a valve seat by resilient means which are not normally accessible. Many valves are of this latter type and reference herein will be made, for the sake of illustration to safety valves on containers for containing pressurized fluids and wherein the resilient means e.g. the spring, is so located as to be accessible either from inside the tank or when the safety valve has been removed from the tank.

The function of a safety valve is to open when the pressure inside a vessel on which it is installed exceeds a predetermined safe pressure. Hitherto, the only method of determining whether or not a safety valve is set to open at the predetermined safe pressure has been to remove the safety valve when the vessel is empty or substantially empty. In many instances, the time intervals between such opportunities to test the setting of the safety valves are relatively long. It is an object of the invention to enable safety valves, and valves of other types mentioned above, to be tested at more frequent intervals.

In one aspect, the invention comprises a method of testing the setting of a valve comprising a valve member biassed towards a valve seat in which a pulling device is engaged with the valve member and operated so that a tractive force is applied to the valve member to separate the valve member from the valve seat against the said bias, and the magnitude of the tractive force and the magnitude of any other force tending to separate the valve member from the valve seat are determined whereby the pressure at which the valve opens can be found.

Preferably, the method is performed when the valve is in situ on a vessel containing at least a gas phase substance under pressure, and a liquid is disposed to cover the valve member whereby the separation of the valve member from the valve seat under the action of the tractive force is indicated by gas bubbles in the liquid.

In another aspect, the invention comprises apparatus for testing the setting of a valve comprising a valve member biassed towards a valve seat, the apparatus comprising engaging means capable of engaging the valve member, a pulling device for applying a tractive force to the engaging means in a direction opposed to said bias, means for operating the pulling device, and indicating means for indicating the magnitude of the tractive force when the valve member is separated from the valve seat. The means for operating the pulling device preferably comprises a hydraulic ram and cylinder and a pump for varying the amount of hydraulic fluid in the cylinder.

The means for indicating the magnitude of the tractive force may be a pressure gauge indicating the pressure of hydraulic fluid in the cylinder. Preferably, the operative or effective area of the hydraulic ram is selected to be in a simple ratio (e.g. 1:1) relative to the operative or effective area of the valve member.

The engaging means may be connected or connectable to the pulling device either by a chain or a solid link, and preferably, the length of the pulling device is adjustable. The engaging means may comprise a screw-threaded part which is engageable with a corresponding screw-thread part of the valve member. Alternatively the engaging means may comprise a ring of resilient material which is wider at one end than the valve member and divided into a plurality of segments at said one end, each segment having a radially inturned lip, and a slidable annular member surrounding the ring which is of such a size that when it is slid towards the said one end of the ring, it squeezes the segments thereof towards each other so that the inturned lips are disposed for engagement against the valve member.

Figure 2:
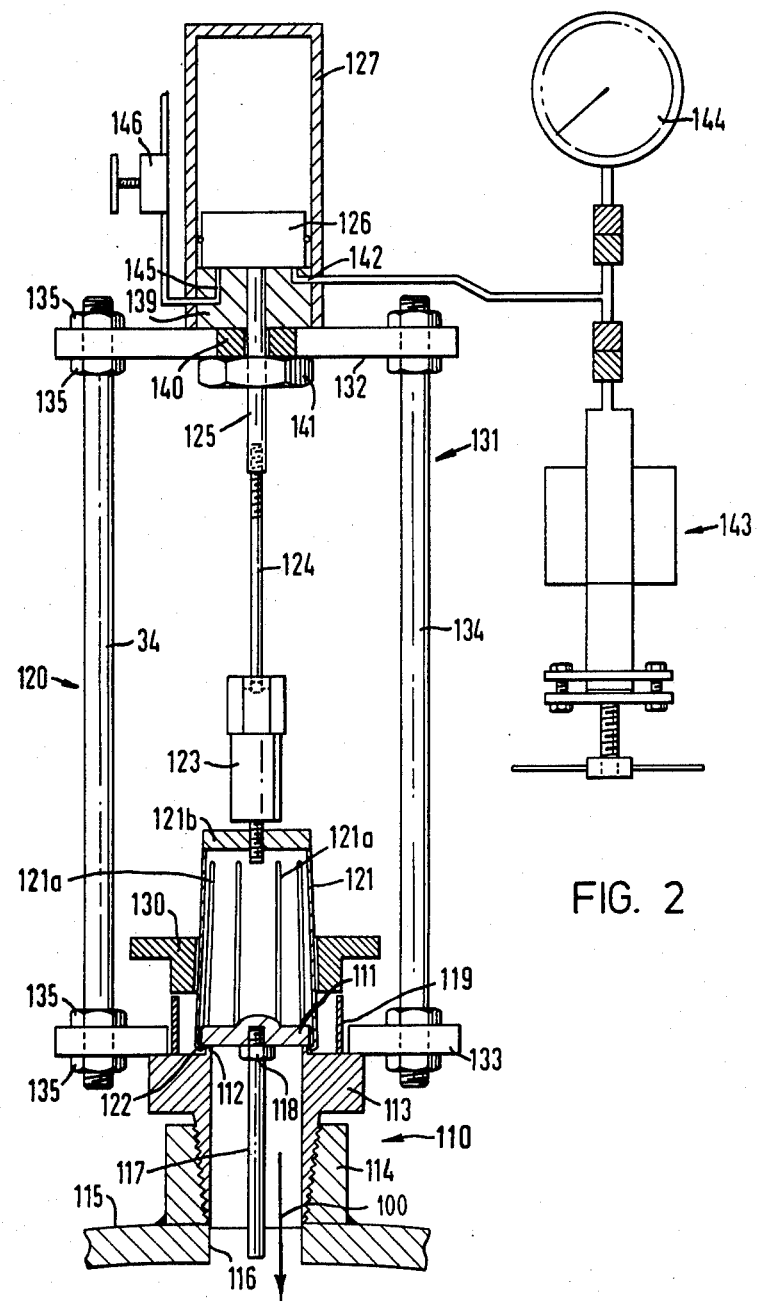

The invention is now further described with reference to two non-limitative examples thereof and with reference to the accompanying drawings in which:

FIG. 1 is a schematic view, partly in section, of one form of apparatus in accordance with the invention; and FIG. 2 is a schematic view, partly in section, of another form of apparatus in accordance with the invention.

Referring first to FIG. 1, a pressurized storage tank for liquid petroleum gas (LPG) is indicated by reference 1, and a pressure gauge 2 mounted on tank 1 indicates the gas pressure therein.

At the top of tank 1, a safety-valve housing 3 is screwed into a sleeve 3a which is welded to the tank 1. The valve comprises a valve member 4 which is biassed towards the valve seat 6 by a spring (not shown) which is within the housing 3 and therefore inaccessible when the valve is mounted on the tank 1. Valve member 4 is generally surrounded by an annular sleeve 5 forming part of the housing 3.

The valve member 4 has a central protrusion 4a projecting away from the tank 1 and the protrusion 4a is formed with external screw threads. The forming of such screw threads is easily effected in most cases when the valve member 4 is of a relatively soft metal such as copper or bronze.

An internally threaded nut 7 is screwed onto the external threads of protrusion 4a, and the nut 7 has attached thereto (e.g. by welding), an eyelet or ring 8 for receiving a hook 9 at one end of a chain 10. The other end of the chain has another hook 11 which is received in a hole provided at the one end of a rod 12, the other end of the rod being attached to a piston or ram 13 which is received within a hydraulic or pneumatic cylinder 14.

The cylinder 14 rests on a plate 15 supported by rods 16 mounted in a yoke 17. The yoke 17 rests on the annular sleeve 5 of the housing 3.

The cylinder 14 is connected by a tube 18 to a hydraulic or pneumatic pump 19 so that air or hydraulic fluid, as the case may be, is passed by the pump 19 into the cylinder 14 beneath the piston 13. A tube 20 connects a pressure gauge 21 to the part of the cylinder 14 which receives air or hydraulic fluid.

When the apparatus of the invention has been connected in the manner described with reference to FIG. 1, the pump 19 is operated to increase the pressure beneath the piston 13 until the valve member 4 is just raised from the valve seat 6. When this occurs, a small quantity of the contents of the tank 1 escapes through the valve. The readings of the pressure gauges 2 and 21 are noted, and calculating, for example, as by multiplying the pressure indicated by gauge 21 by the ratio of the area of the valve member 4 to the area of the piston 13 and adding the resulting pressure to the pressure indicated by gauge 2, the pressure at which the valve 4 is set to open is found.

If the interior of the valve housing 3 is filled with a liquid (e.g. water, optionally with a soap or detergent added), e.g. to the level 22, the instant of separation of the valve member 3 from its seat 6 will be appreciated by the appearance of bubbles in the liquid.

After the readings of the pressure gauges 2 and 21 having been noted, the pump 19 is adjusted to permit the return of air or hydraulic fluid out of the cylinder 14 so that the valve 4 returns to a position of engagement against the valve seat 6 to close off the escape of the contents of the tank.

Reference is now made to FIG. 2 of the accompanying drawings.

The valve which is to be tested, indicated generally by 110, is a safety relief valve of the type referred to as an "internal safety valve" by which is meant that the spring (not shown) biassing the valve member towards its seat (as generally shown by arrow 100) is within the equipment which is intended to be protected against excessive internal pressures. This arrangement is so that the compression in the spring cannot readily be changed so that the pressure which should cause the valve 110 to open is predetermined when the valve is installed and interference therewith, which might lead to dangerous situations, is rendered difficult.

The safety valve 110 comprises a valve member 111 having a (lower) face which registers against a valve seat 112, the latter being a ring which extends upwardly from a valve body 113. As shown, the valve body 113 is threaded into an upwardly protruding nipple 114 welded to the outer wall of a pressurized gas tank 115 around an orifice 116 in the outer wall. The orifice 116 communicates with the hollow interior of the nipple 114. The compression of the internal spring (not shown) acts on a rod 117 which extends coaxially upwards to the valve member 11 and is threaded into a central threaded bore of the latter. A lock nut (or similar fitting) 118 on the threads of the rod 117 engages the underside of the valve member 111 to prevent relative rotation of the rod 117 and the valve member 111 during normal use. Radially outwardly of the valve member 111 is an annular sleeve 119 which projects upwardly from its attachment to the valve body 113 to form a recess and which serves to prevent damage to the valve member 111 at the bottom of the recess. The foregoing is largely conventional although there may be minor variations in the form, construction and/or arrangement of the safety valve 110 as described.

Associated with the safety valve 110 is apparatus of the invention, indicated generally by 120.

The apparatus 120 comprises a cotter 121 of relatively thin metal which is of circular cross-section in its radial planes and which diverges from its upper end, which is closed by a disc 121b, to its lower end. The cotter 121 has a number of slots 121a extending from near the closed narrower end to bottom edge of the cotter at the open wider end thereof. At the open end, each segment of the cotter 121 between the slots 121a is provided with a radially inwardly projecting lip 122, such that the distance between diametrically opposite parts of the lips 122 are separated by a distance which is normally greater than the diameter of the valve member 111, the outer diameter of the wider end of the cotter being less than the inner diameter of the sleeve 119 so that the wider end of the cotter 121 can be freely received around the valve member 111 in the recess bounded by the sleeve 119.

A brass ring 130 having a parallel-walled internal bore surrounds the cotter. The dimensions of the internal bore are such that the ring 130 can be moved lengthwise of the cotter 121 relatively freely (e.g. by hand) but such that the internal wall of the bore engages cooperatively against the external surface of the cotter 121 as the ring 130 is moved towards the wider end of the cotter to squeeze the cotter segments towards each other so that the slots 121a are reduced in width. The effect of this action is to cause the lips 122 to move closer to each other as the ring is moved progressively towards the wider end of the cotter so that the lips 122 can, or actually do, engage the valve member 111. Preferably, the cotter is so disposed that the lips 122 are below the valve member 111, and the dimensions of the parts of the cotter 121 and of the ring 130 are so chosen that when the ring 130 is moved to a position at which it abuts the safety valve or a part thereof (e.g., the top of the sleeve 119), the circle defined by the lips 122 has a diameter greater than that of the valve seat 112 but less than that of the valve member 111 so that the lips will engage against the perimetric region of the lower face of the valve member 111 when an upward pull is exerted on the cotter 112.

Preferably the cotter 121 is formed from a single piece of metal by the following procedure in order that the segments extending from the narrower to the wider end have a desirable distribution of resiliency—the segments being progressively less resilient from the narrow end to a region adjoining the wider end. In a preferred method of making the cotter 121, a solid bar of silver steel having the diameter of the disc 121b is hollowed to a cup-shape, upset at the rim to form a continuous annular lip, slotted (to form the slots 121a) and then hardened and tempered at the closed end and part-way down to the lips 122 so that most of the cotter 121 is resilient while the region thereof including the lips has properties appropriate to the stresses imposed thereon during use.

A coupling 123 is attached, on one side, to the disc 122 by a threaded stud received in a threaded bore in the disc 121b, and on the other side to one end of a connecting rod 124, the other end of which is attached to the piston rod 125 of a hydraulic ram 126 arranged for movement within a surrounding cylinder 127.

The cylinder 127 is mounted on a supported assembly, generally indicated by 131, comprising a top plate 132, a bottom plate 133, and a number of spacing rods 134 having threaded ends protruding through the plates 132, 133 and which maintain the plates 132, 133 a fixed distance apart by nuts 135 threaded on the ends of the rods 134.

The cylinder 127 is secured to the upper face of the top plate 132 by suitable means (not shown).

The top plate has an aperture therethrough of a diameter somewhat greater than that of the piston rod 125, and a brass member 139 (preferably polygonal, e.g. hexagonal, in radial cross-section) is received in the bottom of the cylinder 127 contiguous with the top plate 132. The brass member 139 has a downward protrusion 140 which is received in, and extends below, the plate 132, the lowermost portion of the protrusion being external threaded to receive a locking nut 141 (or locking ring) to engage the brass member 139 securely relative to the top plate 132. The member 139 has a central orifice therethrough for the piston rod 125, suitable seals (not shown) being provided to avoid leakage from the cylinder 127. The brass member 139 has two drillings therein extending radially inwards and then upwards to the top face of member 139 beneath the ran 126, the drillings being in register with corresponding drillings in the cylinder wall. A first drilling 142 is connected to receive hydraulic fluid from a hydraulic pump 143 operated by hand. The pressure of fluid in drilling 142 is indicated by gauge 144. The other drilling 145 is connected to a pressure relief valve 146 which is also hand operated.

The operation of the apparatus of the invention is as follows:

The apparatus 120 is assembled as shown with the lips 122 of the cotter 121 beneath the valve member 111. The bottom plate 133 is rested on the top of valve body 113 and the threaded connections of the connecting rod 124 are adjusted until the hydraulic ram 126 is at or near the bottom of its stroke in the cylinder 127. With the relief valve 146 closed and the brass ring 130 pushed down into abutment with the top of the sleeve 119, the hydraulic pump 143 is operated to pass hydraulic fluid via drilling 142 into the cylinder 127 until the upward force is just sufficient to raise the valve member 111 off its seat 112 permitting a small escape from the interior of tank 115. The occurrence of this escape is readily detected by disposing a layer of liquid (e.g. water containing a detergent) in the recess defined by the sleeve 119 to cover the valve member 111. An escape of gas through the safety valve 110 will show as bubbles in the liquid layer. At this point, the pressures registered by the gauge 144 and also that registered by the pressure gauge (not shown) of the tank 115 are noted. From these pressures, the pressure at which the safety valve 110 opens can readily be determined. If the effective areas of the ram 126 and the valve member 111 are the same, the safety valve opening pressure is substantially the sum of the pressure in the tank 115 and the pressure registered by the gauge 144.

When the pressures have been noted, the pressure in the cylinder 127 is relieved by operating the hydraulic pump 143 in reverse. If the hydraulic system contains air, or if an emergency occurs the valve 146 is opened to discharge the air and/or hydraulic fluid via drilling 145.

Preferably, the foregoing operations are repeated a number of times.

It will be seen that the apparatus of the invention involves no modification to the safety valve, and that the safety valve can be reliably and repeatedly tested in situ with the tank containing inflammable and/or hazardous materials. It is unnecessary to employ skilled personnel, the apparatus is portable and can be used in succession on a number of tanks in a short time. Moreover, the previous practice of waiting until a tank was empty before a safety valve could be removed for testing (usually at the valve manufacturer) is not necessary and testing can be performed more frequently leading to improved safety.

We claim:

1. A method of measuring in situ the magnitude of the pressure at which a valve is set to release from its valve seat comprising the steps of:

disengaging a biased valve from a valve seat of a pressure vessel by applying a pressure to a piston in tractive engagement with said valve to tractively lift said valve from said valve seat;

noting the instant in time when said valve is disengaged from said valve seat;

measuring the pressure in said pressure vessel;

measuring the disengagement pressure needed to tractively lift said valve from said valve seat at said instant in time; and calculating from said disengagement and vessel pressures a pressure value in order to determine in situ the release setting of said valve.

2. A method as in claim 1 in which the valve is in situ on a vessel containing at least a gas phase substance under pressure, and wherein a liquid is disposed to cover the valve member whereby the separation of the valve member from the valve seat under the action of the tractive force is indicated by gas bubbles in the liquid.

3. Apparatus for measuring in situ the magnitude of the pressure at which a valve is set to release from its valve seat comprising:

a valve in a valve chamber;

a pressure vessel having a valve seat, said valve being generally engaged with and urged by means of a spring toward said valve seat against the pressure in said pressure vessel;

means for disengaging said valve from said valve seat by applying a pressure to a piston in tractive engagement with said valve to tractively lift said valve from said valve seat and noting the instant in time when said valve is disengaged from said valve seat;

means to measure the pressure in said pressure vessel; and means connected to said valve chamber to measure the disengaging pressure needed to tractively lift said valve from said valve seat at said instant in time, whereby the release setting of the valve may be determined in situ by a sum calculation of said vessel and disengaging pressures.

4. Apparatus as in claim 3 in which the means for disengaging said valve from said valve seat comprises a hydraulic ram and cylinder and a pump for varying the amount of hydraulic fluid in the cylinder.

5. Apparatus as in claim 4 in which the means for indicating the magnitude of the tractive force is a pressure gauge indicating the pressure of hydraulic fluid in the cylinder.

6. Apparatus as claim 5 in which the operative area of the hydraulic ram is selected to be in a simple ratio relative to the operative area of the valve member.

7. Apparatus according to claim 6 in which the disengaging means further comprises a ring of resilient material which is wider at one end than said valve and divided into a plurality of segments at said one end, each segment having a radially inturned lip, and a slidable annular member surrounding the ring which is of such a size that when it is slid towards the said one end of the ring, it squeezes the segments thereof towards each other so that the inturned lips are disposed for engagement against said valve.

* * * * *